(12) United States Patent
Ogden et al.

(10) Patent No.: US 6,432,331 B1
(45) Date of Patent: Aug. 13, 2002

(54) TANK BOTTOM RESTORATION PROCESS

(75) Inventors: Becky L. Ogden, Midland; Bradley D. Hutchison, San Angelo, both of TX (US); George P. Southwell, Denver, CO (US)

(73) Assignee: Marathon Oil Company, Findlay, OH (US)

( * ) Notice: Subject to any disclaimer, the term of this patent is extended or adjusted under 35 U.S.C. 154(b) by 588 days.

(21) Appl. No.: 08/829,863

(22) Filed: Apr. 1, 1997

(51) Int. Cl.[7] .............................................. B32B 35/00
(52) U.S. Cl. ..................... 264/32; 264/36.15; 264/36.22
(58) Field of Search ............................. 264/32, 35, 36, 264/36.15, 36.18, 36.2, 36.22

(56) References Cited

U.S. PATENT DOCUMENTS

| | | | |
|---|---|---|---|
| 3,450,295 A | | 6/1969 | Weber ............................. 2/18 |
| 3,578,479 A | * | 5/1971 | Packo .......................... 264/36 |
| 3,608,000 A | * | 9/1971 | Anderson .................... 264/36 |
| 3,634,560 A | * | 1/1972 | Anderson .................... 264/36 |
| 3,709,712 A | * | 1/1973 | Rossman ..................... 264/36 |
| 3,711,309 A | * | 1/1973 | Packo .......................... 264/36 |
| 3,930,068 A | * | 12/1975 | Sloan .......................... 264/36 |
| 4,010,231 A | * | 3/1977 | Phillips et al. ................ 264/36 |
| 4,222,975 A | | 9/1980 | Kirschke ...................... 264/35 |
| 4,683,949 A | | 8/1987 | Sydansk et al. ............ 166/270 |
| 4,706,754 A | | 11/1987 | Smith ......................... 166/295 |
| 5,131,469 A | | 7/1992 | Lockhart et al. ............ 166/295 |
| 5,143,958 A | | 9/1992 | Lockhart et al. ............ 524/219 |
| 5,172,825 A | | 12/1992 | Clay ........................... 220/565 |
| 5,219,475 A | | 6/1993 | Lockhart et al. ......... 252/8.551 |
| 5,219,476 A | | 6/1993 | Lockhart et al. ......... 252/8.551 |
| 5,332,335 A | * | 7/1994 | Daul ............................ 264/35 |
| 5,431,226 A | | 7/1995 | Sydansk ..................... 166/295 |
| 5,499,659 A | * | 3/1996 | Naf .............................. 264/36 |
| 5,622,209 A | * | 4/1997 | Naf .............................. 264/36 |

* cited by examiner

*Primary Examiner*—Jan H. Silbaugh
(74) *Attorney, Agent, or Firm*—Jack E. Ebel

(57) ABSTRACT

A process for restoring the damaged bottom of a storage tank. The process is initiated by preparing a slurry containing unconsolidated solids and a gelation solution. The gelation solution includes an aqueous liquid solvent, a crosslinkable polymer, and a crosslinking agent. The slurry is placed on the internal bottom surface of the storage tank in a sufficient volume to fully cover the surface. The gelation solution is then gelled substantially to completion in the storage tank to form a gel that binds the unconsolidated solids and converts the slurry into a hardened conglomeration. The hardened conglomeration provides a coat over the internal bottom surface of the storage tank to prevent further damage to the bottom of the tank and leakage therethrough.

18 Claims, 1 Drawing Sheet

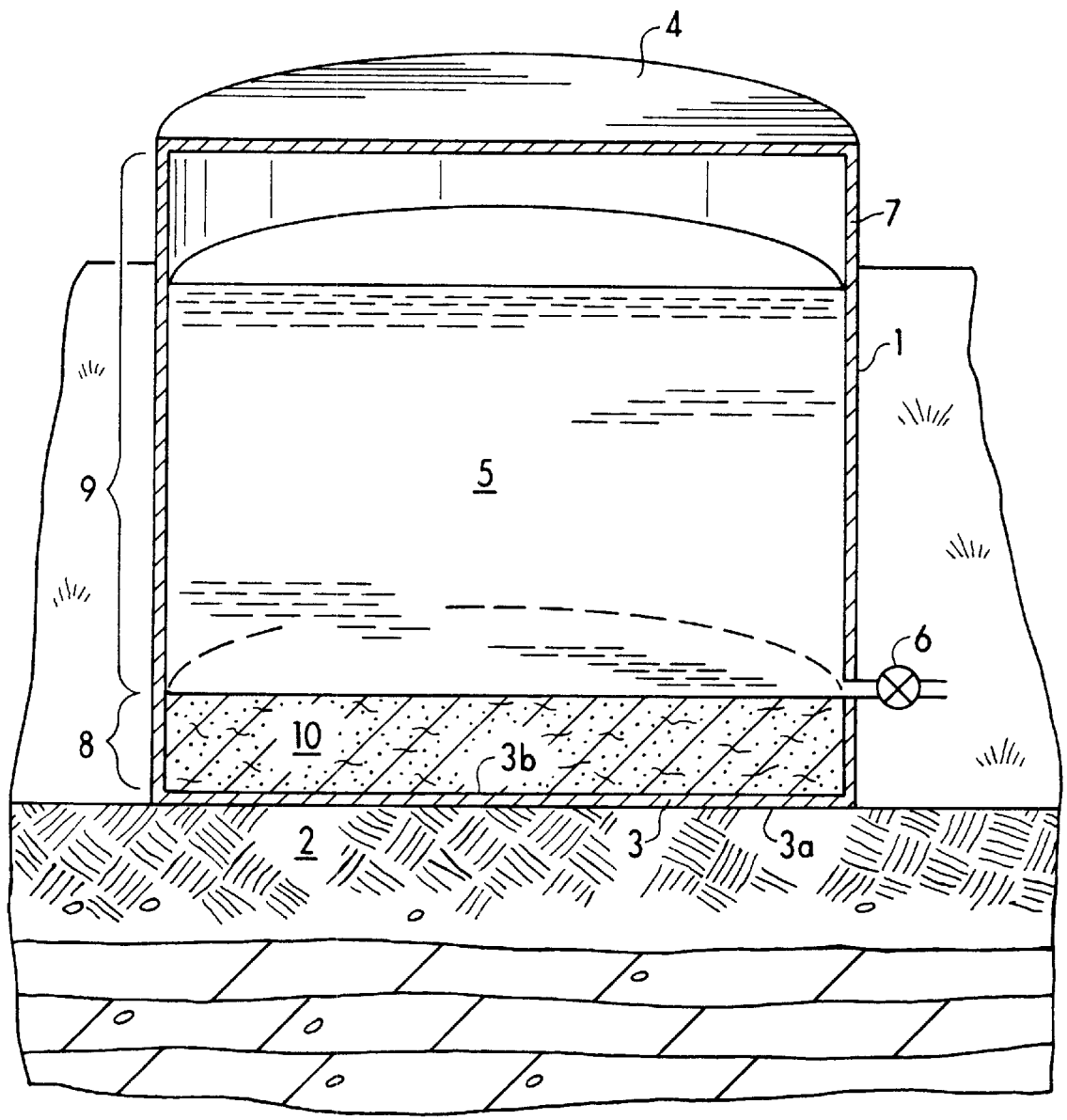

TANK BOTTOM RESTORATION PROCESS

TECHNICAL FIELD

The present invention relates to storage tanks and more particularly to a process for restoring the damaged bottom of a storage tank.

BACKGROUND OF THE INVENTION

Storage tanks have many applications related to the production, refining and distribution of hydrocarbons. For example, storage tanks are a customary means for storing raw oil field products including crude oil or produced water at production sites. It has been found that the corrosive character of the raw products can damage the tanks in which the products are stored over time. Metallic tank bottoms are particularly susceptible to damage by corrosion or pitting from oil field liquids. Corrosion or pitting damage can ultimately breach the tank bottom, resulting in leakage of the stored liquids from the tank into the surrounding environment and harm thereto. Accordingly, it is imperative that such damage is rapidly and effectively repaired to restore the integrity of the tank, either as a preventive step prior to the occurrence of leakage from the tank or as remedial step after the occurrence of leakage to inhibit further leakage therefrom.

A number of corrective procedures applicable to storage tanks are known in the prior art. For example, the entire tank can be replaced in the case of severe and irreparable tank bottom damage. In less severe cases, tank repair options include replacing the damaged tank bottom with a new steel bottom, installing a steel or fiberglass patch over the damaged portion of the tank bottom, welding the damaged portion of the tank bottom, or overlaying a reinforced fiberglass liner atop the entire damaged tank bottom. Although each of these procedures may effectively restore the integrity of the tank bottom, none is entirely satisfactory because all require human entry into the tank and are relatively costly, time-consuming and labor intensive to perform, demanding a high degree of skill.

Another repair option is taught by U.S. Pat. No. 3,450,295, wherein a coat of foamed plastic material, such as a foamed resin, is placed over the damaged tank bottom. This procedure generally requires human entry into the tank, but is advantageously less costly and more rapid to perform than the procedures recited above. Nevertheless, this procedure requires a high degree of surface preparation for the tank bottom. In addition, placement of the foamed material requires a high degree of care in mixing the components of the foamed material and properly distributing the foamed material across the tank bottom. Finally, the load-bearing capacity of the foamed material is unduly limiting for many applications.

Yet another repair option is taught by U.S. Pat. No. 5,172,825, wherein a polymer gel plug is placed in the tank bottom to eliminate dead tank volume as well as to provide protection from leakage in the event of corrosion. This procedure generally does not require human entry into the tank and is relatively inexpensive and rapid to perform. Again, however, the load-bearing capacity of the polymer gel may be unduly limiting for many applications. As such a need exists for a more effective process of restoring the integrity of a damaged storage tank.

Accordingly, it is an object of the present invention to provide an effective process for restoring a damaged storage tank. More particularly, it is an object of the present invention to provide an effective process for restoring the bottom of a storage tank damaged by corrosion or pitting, wherein the tank has specific utility in hydrocarbon production, refining or distribution applications. It is another object of the present invention to provide a process for restoring the bottom of a storage tank that does not require human entry into the tank. It is another object of the present invention to provide a process for restoring the bottom of a storage tank that is cost effective. It is still another object of the present invention to provide a process for restoring the bottom of a storage tank that is relatively simple to perform. It is yet another object of the present invention to provide a process for restoring the bottom of a storage tank that requires relatively little time to perform. It is a further object of the present invention to provide a process for restoring the bottom of a storage tank that requires little or no surface preparation of the tank bottom. It is a still further object of the present invention to provide a process for restoring the bottom of a storage tank to a high load-bearing capacity. These objects and others are achieved in accordance with the invention described hereafter.

SUMMARY OF THE INVENTION

The present invention provides a process for restoring the damaged bottom of a storage tank. The process is initiated by preparing a slurry containing unconsolidated solids and a gelation solution. The unconsolidated solids are preferably in a particle form, such as conventional aggregates, or in a fiber form, such as conventional lost circulation materials used in drilling applications. The gelation solution includes an aqueous liquid solvent, a crosslinkable polymer, and a crosslinking agent. The crosslinkable polymer is preferably an acrylamide polymer and the crosslinking agent preferably includes a polyvalent metal cation selected from the group consisting of aluminum, chromium and mixtures thereof. The slurry is placed on the internal bottom surface of the storage tank in a sufficient amount to cover the surface. Preparation and placement of the slurry is effected either by dispensing the gelation solution and unconsolidated solids sequentially into the storage tank and forming the slurry in situ or by mixing the gelation solution and unconsolidated solids external to the storage tank to form the slurry and dispensing the premixed slurry into the storage tank.

After placement of the slurry on the internal bottom surface of the tank, the gelation solution is gelled substantially to completion in situ to form a gel that binds the unconsolidated solids, converting the slurry to a hardened continuous solid conglomeration containing the gel and solids. The hardened conglomeration provides a coat over the internal bottom surface of the storage tank having a relatively high load-bearing capacity that prevents further damage to the bottom of the tank and leakage therethrough.

The invention will be further understood from the accompanying drawings and description.

BRIEF DESCRIPTION OF THE DRAWINGS

The FIGURE shows a conceptual conventional raw oil field product storage tank having a coat of a hardened conglomeration laid over the damaged internal bottom surface of the tank in accordance with the process of the present invention.

DESCRIPTION OF PREFERRED EMBODIMENTS

The present invention is a process for restoring the bottom of a storage tank that has been damaged by destructive forces such as corrosion or pitting. The process employs a coat of conglomeration that is laid over the internal bottom surface of the storage tank to restore the integrity of the tank bottom. A conglomeration is defined herein as a plurality of discrete unconsolidated solids bound together by a bonding agent to form a continuous hardened solid material. The conglomeration is derived from a slurry comprising the unconsolidated solids and a gelation solution. The slurry placed is in the tank and the gelation solution is aged to maturity therein producing the desired conglomeration.

The present tank bottom restoration process is applicable to substantially any storage tank and is particularly applicable to storage tanks utilized in the production, refining or distribution of hydrocarbons. Such tanks are typically above-ground metallic or fiberglass tanks used to store raw oil field products in a liquid state. These products include crude oil, produced water or mixtures thereof. Although the products are generally produced and stored in a liquid state, the products may also have produced solids suspended or entrained therein. The restoration process is employed in either a preventive capacity where a tank bottom has incurred no damage or insufficient damage to cause leakage of stored liquids from the tank, or in a remedial capacity where a tank bottom has incurred sufficient damage to cause leakage of stored liquids from the tank.

Referring to the FIGURE, the tank bottom restoration process is shown preferably applied to a conventional raw oil field product storage tank 1. It is readily apparent to the skilled artisan, however, that the present process is adaptable to substantially any storage tank, including refined liquid hydrocarbon product storage tanks described in U.S. Pat. No. 5,172,825, incorporated herein by reference. The raw oil field product storage tank 1 of the FIGURE is typically cylindrically shaped with its axis aligned perpendicular to the ground 2. The enclosed bottom 3 of the tank is stationary, having an external bottom surface 3a resting upon the ground and an internal bottom surface 3b exposed to the interior of the tank 1. The top of the tank 1 is shown to be enclosed by a fixed cover 4, but is understood that the top of the tank 1 may alternatively be open, or enclosed by a floating roof (not shown). The nominal volume of the tank 1 and correspondingly the storage capacity of the liquid product 5 is generally in a range between about 200 barrels (32 m$^3$) and about 50,000 barrels (7900 m$^3$). The height of the tank 1 is generally between about 8 feet (2.4 m) and about 30 feet (9.1 m). The tank 1 has an outlet port 6 in its sidewall 7 usually in the form of a valve or nozzle that enables withdrawal of the stored liquid product 5 from the tank 1. The outlet port 6 is normally positioned between about 4 inches (0.10 m) and about 6 inches (0.15 m) above the tank bottom.

Positioning the outlet port 6 above the tank bottom 3 results in a "dead volume" 8 in the internal tank volume. The dead volume 8 is the portion of the internal tank volume extending downward in the tank from the level of the port 6 to the tank bottom 3. This dead volume usually comprises from about 1% to about 6% of the internal tank volume. The remainder of the internal tank volume is termed the "tank storage volume" 9. The internal tank volume below the outlet port 6 is termed the dead volume because liquids cannot be recovered from the dead volume 8 via the outlet port 6 using only gravitational forces. Other means, such as specialized nozzles and pumps, are required to recover liquids from the dead volume 8.

The present invention is practiced by preparing a slurry and placing the slurry atop the internal bottom surface 3b of the tank within the dead volume 8. The slurry comprises a gelation solution and unconsolidated solids. The gelation solution is a gel precursor that is transformable from a solution to a gel after being aged to maturity in the storage tank 1 for a predetermined gel time. A "gel" is defined herein as a continuous three-dimensional crosslinked polymeric network integrating a liquid into the interstices of the network. The gel is advantageously inert, i.e., unreactive, with the liquids being stored in the tank 1 and is additionally immiscible in the liquids. Thus, the gel is substantially incapable of commingling with or contaminating the stored liquids by mixing, reacting, dissolving, or other means.

The gelation solution comprises a crosslinkable polymer and a crosslinking agent in solution within an aqueous solvent, and optionally, a gelation-rate controlling agent. Crosslinkable polymers are well known in the art and any such water-soluble carboxylate-containing polymer, whether a biopolymer or a synthetic polymer, has utility in the gelation solutions of the present invention. Water-soluble carboxylate-containing biopolymers having utility herein include polysaccharides and modified polysaccharides, such as xanthan gum, guar gum, succinoglycan, scleroglycan, polyvinylsaccharides, carboxymethylcellulose, o-carboxychitosans, hydroxyethylcellulose, hydroxypropylcellulose, and modified starches.

Water-soluble carboxylate-containing synthetic polymers having utility herein are preferably acrylamide polymers. Acrylamide polymers are polymers having one or more acrylamide groups and include polyacrylamide (PA), partially hydrolyzed polyacrylamide (PHPA), copolymers of acrylamide and acrylate, and terpolymers and tetrapolymers of acrylamide. PA, as defined herein, has from about 0% to about 3% of its amide groups hydrolyzed. Although 0% hydrolyzed PA initially lacks any carboxylate groups, it generates carboxylate groups under the conditions of the present process, thereby satisfying the definition of carboxylate-containing polymers having utility within the scope of the present invention. PHPA has greater than about 3% of its amide groups hydrolyzed and less than 100% of its amide groups hydrolyzed. The average molecular weight of an acrylamide polymer having utility herein is generally in a range between about 10,000 and about 50,000,000, preferably between about 150,000 and about 30,000,000, and most preferably between about 200,000 and about 20,000,000.

Crosslinking agents having utility in the present gelation solution are water-soluble complexes containing a reactive transition metal cation and an organic carboxylate anion. Reactive transition metal cations include iron, aluminum or chromium. The term "carboxylate anion" as used herein encompasses carboxylate anionic species including monocarboxylate anions, such as acetate and propionate, polycarboxylate anions, such as malonate, and substituted derivatives of carboxylate anions, such as glycolate and lactate. The carboxylate anions are generally obtained from the corresponding acids or salts thereof. Preferred among such crosslinking agents are those including one or more chromium(III) cations complexed with one or more carboxylate anions. An example of a preferred crosslinking agent is one or more chromium(III) cations complexed with one or more acetate anions, as taught in U.S. Pat. No. 4,683,949 which is incorporated herein by reference.

Optional gelation-rate controlling agents having utility in the present gelation solution are conventional gelation-rate accelerating or gelation-rate retarding agents. Conventional gelation-rate retarding agents include carboxylic acids taught by U.S. Pat. Nos. 4,706,754; 5,131,469; 5,143,958; 5,219,475; and 5,219,476, incorporated herein by reference. Such carboxylic acids include acetic acid, propionic acid, lactic acid, malonic acid and glycolic acid. Retarding agents having utility herein also include the carboxylate salts of the above-recited carboxylic acids, including ammonium, potassium or sodium salts of acetate, propionate, lactate, malonate or glycolate.

Alternatively, delayed gelation can be achieved while excluding the optional retarding agent from the gelation solution by employing a decarboxylated crosslinking agent in the gelation solution in the manner of U.S. Pat. No. 5,431,226, incorporated herein by reference. Accordingly, the term "crosslinking agent" as used herein to describe gelation solution components includes conventional crosslinking agents and polycarboxylate precursors of conventional mono-carboxylate crosslinking agents that are decarboxylated to the conventional mono-carboxylate crosslinking agent in situ at high temperature.

The aqueous solvent of the gelation solution is an aqueous liquid capable of forming a solution with the selected polymer, crosslinking agent, and optional elation-rate controlling agent. The term "solution" as used herein, in addition to true solutions, is intended to broadly encompass dispersions, emulsions, or any other homogeneous mixture of the gelation solution components in the aqueous solvent. Aqueous solvents include distilled water, fresh water, sea water, or oilfield brines. Fresh water is usually preferred.

The gelation solution is prepared by admixing all of the solution components, including the polymer, crosslinking agent, and solvent, together to form a homogeneous fluid. The order of mixing the solution components is not specific to the practice of the present invention. Admixing broadly encompasses premixing the components in bulk and dispensing the resulting gelation solution into the storage tank 1, simultaneously mixing the components in-line while dispensing the gelation solution into the storage tank 1 or sequentially dispensing the components into the storage tank 1 and mixing the components in situ to form the gelation solution. Premixing the components before dispensing the gelation solution into the storage tank 1 is the preferred method of admixing the components because it ensures uniform mixing and optimum gel formation. The polymer, crosslinking agent, and optional gelation-rate controlling agent can initially be in a solid or liquid state. Where the crosslinking agent is added to the gelation solution in the form of a chromium(III)/carboxylate complex, preferred forms of the chromium(III)/acetate complex crosslinking agent are solid $CrAc_3$, solid $CrAc_3.H_2O$, solid $Cr_3Ac_7(OH)_2$ or a solution labeled "Chromic Acetate 50% Solution" that is commercially available, for example, from McGean-Rohco Chemical Co., Inc., 1250 Terminal Tower, Cleveland, Ohio 44113, U.S.A.

The polymer concentration of the resulting gelation solution is generally at least about 500 ppm, preferably at least about 2,000 ppm, and most preferably within a range between about 5,000 ppm and about 100,000 ppm. The crosslinking agent concentration of the gelation solution is generally between about 44 ppm and about 88,000 ppm, and preferably between about 88 ppm and about 18,000 ppm. As such, the corresponding chromium(III) cation concentration of the gelation solution is generally between about 10 ppm and about 20,000 ppm, and preferably between about 20 ppm and about 4,000 ppm.

The unconsolidated solids of the slurry are stantially any discretely divided solid material that is porous in bulk. The unconsolidated solids are inert and insoluble in the gelation solution or any liquids to be stored in the storage tank 1 and do not substantially degrade the resulting gel or contaminate any liquids to be stored in the storage tank 1. The unconsolidated solids are preferably in particle or fiber form. Exemplary solids in particle form are agglomerates, including sand or gravel. The particles preferably have a substantially higher density than the gelation solution or gel resulting therefrom. Exemplary fibers are those conventionally used as lost circulation materials in oil well drilling applications, including wood fibers and fiberglass. The volumetric ratio of unconsolidated solids to gelation solution in the slurry is preferably between about 0.5:1 and about 2:1. Ratios greater than 2:1, however, are possible where the slurry is formed in situ, as described hereafter.

Preparation and placement of the slurry in the storage tank 1 is generally effected in accordance with one of two embodiments. The first embodiment employs sequential placement of the slurry, wherein the gelation solution is prepared by any one of the alternatives recited above and dispensed into the storage tank 1 to substantially cover the internal bottom surface 3b of the storage tank 1. The gelation solution may be dispensed into the tank 1 by pumping the gelation solution from an external source (not shown) through the outlet port 6 of the tank or by any other means of access to the tank 1 from the exterior thereof. The pump is operated in a manner that does not substantially shear the crosslinkable polymer contained within the gelation solution.

The unconsolidated solids are sequentially dispensed thereafter into the tank 1 in a manner that substantially uniformly distributes the unconsolidated solids throughout the gelation solution to form the slurry in situ. The unconsolidated solids may be dispensed into the tank 1 by pneumatically spraying or otherwise scattering the solids onto the surface of the gelation solution previously dispensed into the tank 1 and allowing the material to uniformly disperse throughout the gelation solution as predicted by Stokes' law. This first embodiment is particularly applicable to solids in the form of particles that behave in accordance with Stokes' law and that form slurries not readily pumpable in a non-shearing manner.

The second embodiment employs batch placement of the slurry, wherein the unconsolidated solids and the gelation solution are mixed external to the storage tank to form the slurry. The resulting slurry may be dispensed into the tank 1 by pumping the slurry from an external source (not shown) through the outlet port 6 or any other means of access to the tank 1 to substantially cover the internal bottom surface 3b of the storage tank 1. As in the previous embodiment, the pump is operated in a manner that does not substantially shear the crosslinkable polymer contained within the slurry. This second embodiment is particularly applicable to fibers or other solids that do not behave in accordance with Stokes' law and/or form slurries that are readily pumpable in a non-shearing manner.

In either case, placement of the slurry in the tank 1 results in a sufficient volume of slurry residing in the dead volume 8 of the tank 1 to extend from the internal bottom surface 3b to a height of at least about 5 cm up to a height of at least about 10 cm. The maximum height of the slurry in the tank bottom 3 is up to the level of the outlet port 6. Thus, the slurry should not exceed the dead volume 8 of the tank 1 to avoid blocking the outlet port 6 and inhibiting the addition of liquid product 5 to the tank 1 or the withdrawal of stored liquid product 5 from the tank 1 via the outlet port 6.

It is noted that the internal bottom surface 3b of the tank does not require substantial preparation prior to placement of the slurry thereover. Accordingly, the present process usually does not require human entry into the tank 1 during performance thereof. Slurry placement, however, is generally facilitated by emptying the tank storage volume 9 of liquid product 5 before placing the slurry in the tank 1. Nevertheless, it may be desirable to allow contaminants to remain in the dead volume 8 during placement of the slurry. The term "contaminants" as used herein includes any non-hydrocarbon entrained in the product 5, but which is heavier than the product 5 causing the contaminant to settle out of the product 5 during prolonged storage. Water is the most common contaminant, being present to some degree in virtually all liquid hydrocarbon products. Other possible contaminants include solid sediment. If one compensates for the contaminants when preparing the slurry by reducing the volume of aqueous solvent or unconsolidated solids, depending on the specific character of the contaminants, the contaminants become incorporated into the slurry, thereby obviating the need to remove the contaminants from the dead volume 8 before placement of the slurry. Alternatively, it may be desirable to empty the dead volume 8, as well as the storage volume 9, before placement of the slurry. Although not required and generally not advantageous, in some cases it may also be desirable to rinse, clean, or otherwise treat the internal bottom surface 3b of the tank before placement of the slurry.

Following placement of the slurry in the tank 1, the gelation solution is aged therein for a time period sufficient to gel the solution to full maturity, i.e., complete gelation, forming a substantially non-flowing, and preferably rigid, gel. Thus, the skilled artisan can appreciate that the gelation solution desirably has a gelation rate sufficiently slow to enable placement of the slurry in the tank 1 in a fluid state before the gelation solution achieves a non-flowing state. If the gelation rate is too rapid, it can be extremely difficult to place the slurry in the tank 1 due to its rheological properties. Nevertheless, the gelation rate should be sufficiently rapid to enable completion of the gelation reaction within a reasonable time period after placement of the slurry in the tank 1. If desired, the practitioner can tailor the gelation rate by the addition of a gelation-rate controlling agent to the gelation solution as set forth above. In particular, if the present process is practiced at extremely low ambient temperatures, it may be desirable to include a gelation-rate accelerating agent in the gelation solution. Conversely, if the process is practiced at extremely high ambient temperatures, it may be desirable to include a gelation-rate retarding agent in the gelation solution.

In any event, it is within the purview of the skilled artisan to select values for all the relevant independent process parameters producing a gel that satisfies the performance requirements of the present process inter alia with respect to gelation rate, gel strength and gel stability. Such relevant parameters can include the component concentrations, the actual species of the polymer and crosslinking agent, the molecular weight of the polymer, and the pH and temperature conditions of gelation. Gelation may be enhanced by increasing the temperature or increasing the pH of the gelation solution. However, a gelation solution is preferred that matures to a non-flowing gel without requiring significant pH or temperature modification.

Conversion of the gelation solution to a gel, correspondingly converts the slurry to the desired hardened conglomeration within the tank 1. The gel constitutes the bonding agent or cement of the conglomeration that binds the unconsolidated solids into a single continuous coat 10 conforming to the contours of the tank bottom 8 including the sidewall 7 and internal bottom surface 3b. The gel also effectively forms a fluid seal between the coat 10, the tank bottom 8 and the sidewall 7 to prevent leakage of stored liquids behind the coat 10. The coat 10 is highly rigid, rendering it extremely durable and strong relative to the gel alone under temperature and pressure conditions encountered in the tank 1 during product storage. The coat 10 is resistant to deformation when the liquid product 5 is placed in the tank 1 or withdrawn from the tank 1. The coat 10 is retained in the tank 1 indefinitely without substantial degradation by the liquid product 5 or displacement during normal tank operation. Thus, the coat 10 may be effectively permanent when the storage tank 1 is returned to operation with the liquid product 5 occupying the tank storage volume 9.

Nevertheless, if it is only desired to retain the coat 10 in the tank 1 for a temporary finite time period, the coat 10 can be removed at the end of the time period by either chemical, physical, or thermal degradation, although chemical degradation is preferred. The gel is chemically degraded by contacting it with a concentrated solution of a conventional oxidant such as hydrogen peroxide or sodium hypochlorite. Hydrogen peroxide is the preferred oxidant. Once the gel breaks down, the coat 10 is restored to a slurry that is readily removable from the tank 1.

The following example demonstrates the practice and utility of the present invention, but is not to be construed as limiting the scope of the invention.

EXAMPLE

An above-ground cylindrical steel storage tank is used to store crude oil. The tank has an internal volume of 210 barrels (33.6 $m^3$) and is 15 feet (4.6 m) high. The internal surface of the tank bottom is damaged by corrosion and it is desired to restore the damaged internal bottom surface. Therefore, the crude oil is drained from the tank. An aqueous gelation solution is prepared by mixing a chromic acetate complex crosslinking agent with an aqueous partially hydrolyzed polyacrylamide solution. The molecular weight of the polymer is 11,000,000 and the polymer is 30% hydrolyzed. The polymer concentration in the gelation solution is 3,000 ppm. The ratio of polymer to chromic acetate complex in the gelation solution is about 5:1.

2 barrels (0.32 $m^3$) of the flowing gelation solution are pumped into the dead volume of the tank via the outlet port and the gelation solution covers the internal tank bottom. 0.5 $m^3$ of sand are then sprayed onto the gelation solution to form a slurry. The slurry is aged for 48 hours at an ambient temperature of 21° C. to form a hardened conglomeration that coats the internal surface of the tank bottom. Thereafter, the tank is restored to operation by refilling it with crude oil.

While the foregoing preferred embodiment of the invention has been described and shown, it is understood that all alternatives and modifications, such as those suggested and others, may be made thereto and fall within the scope of the invention.

We claim:

1. A process for restoring a storage tank comprising:
   preparing a slurry containing unconsolidated solids and a gelation solution, wherein said gelation solution includes an aqueous liquid solvent, a crosslinkable polymer and a crosslinking agent;
   placing said slurry in a storage tank having an internal bottom surface;
   gelling said gelation solution substantially to completion in said storage tank to form a gel; and
   binding said unconsolidated solids with said gel to convert said slurry into a continuous hardened conglomeration.

2. The process of claim 1 wherein said unconsolidated solids in said slurry have a volumetric ratio with respect to said gelation solution in said slurry of greater than about 1:1.

3. The process of claim 1 wherein said unconsolidated solids in said slurry have a volumetric ratio with respect to said gelation solution in said slurry of at least about 2:1.

4. A process for restoring a storage tank comprising:

sequentially dispensing a gelation solution and unconsolidated solids into a storage tank having an internal bottom surface thereby forming a slurry containing said unconsolidated solids and said gelation solution, wherein said gelation solution includes an aqueous liquid solvent, a crosslinkable polymer and a crosslinking agent:

gelling said gelation solution substantially to completion in said storage tank to form a gel; and binding said unconsolidated solids with said gel to convert said slurry into a continuous hardened conglomeration.

5. The process of claim 1 wherein said slurry is placed in said storage tank by mixing said gelation solution and said unconsolidated solids external to said storage tank and dispensing said slurry into said storage tank.

6. The process of claim 1 wherein said unconsolidated solids are in particle form.

7. The process of claim 1 wherein said unconsolidated solids are an aggregate.

8. The process of claim 1 wherein said unconsolidated solids are sand or gravel.

9. The process of claim 1 wherein said unconsolidated solids are in a fiber form.

10. The process of claim 1 wherein said unconsolidated solids are a lost circulation material.

11. The process of claim 1 wherein said unconsolidated solids are wood fiber or fiber glass.

12. The process of claim 1 wherein said slurry is placed on said internal bottom surface of said storage tank.

13. The process of claim 1 wherein said slurry is placed on said internal bottom surface in a volume sufficient to substantially cover said internal bottom surface.

14. The process of claim 1 wherein said slurry is placed on said internal bottom surface in a volume sufficient to substantially cover said internal bottom surface to a height of at least about 5 cm above said internal bottom surface.

15. The process of claim 1 wherein said slurry is placed on said internal bottom surface in a volume sufficient to substantially cover said internal bottom surface to a height substantially level with a bottom outlet valve of said storage tank.

16. The process of claim 1 wherein said crosslinkable polymer is an acrylamide polymer.

17. The process of claim 1 wherein said crosslinking agent includes a polyvalent metal cation selected from the group consisting of aluminum, chromium and mixtures thereof.

18. A process for restoring a storage tank comprising:

preparing a slurry containing a plurality of unconsolidated solids and a gelation solution, wherein said unconsolidated solids are in a particle or fiber form and said gelation solution includes an aqueous liquid solvent, an acrylamide polymer and a crosslinking agent containing a polyvalent metal cation selected from the group consisting of aluminum, chromium and mixtures thereof;

placing said slurry in a storage tank having an internal bottom surface;

gelling said gelation solution substantially to completion in said storage tank to form a gel: and binding said unconsolidated solids with said gel to convert said slurry into a continuous hardened conglomeration.

* * * * *